Nov. 8, 1932.    J. S. TRITTON    1,887,074
LAMP CONTROL FOR VEHICLES
Original Filed Sept. 3, 1931
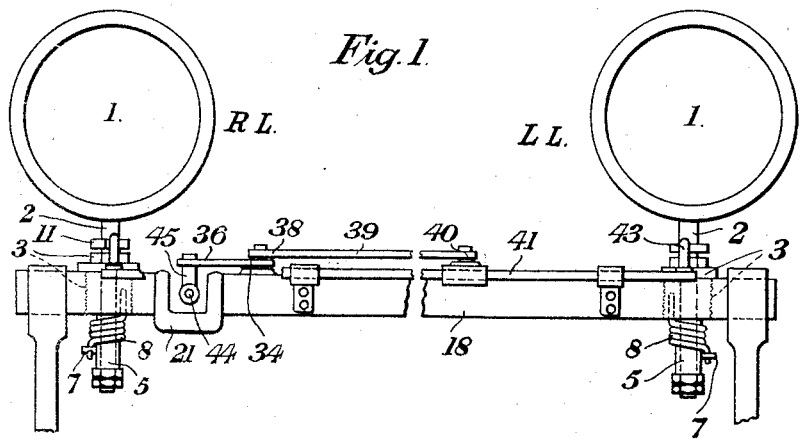
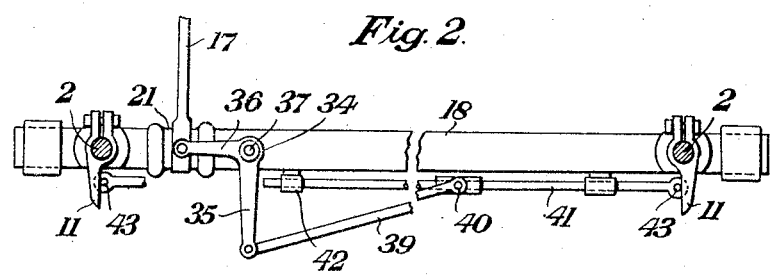
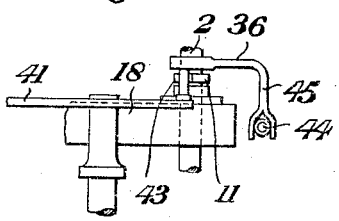
Inventor
J. S. TRITTON Patented Nov. 8, 1932

1,887,074

UNITED STATES PATENT OFFICE

JULIAN SEYMOUR TRITTON, OF SURBITON, ENGLAND

LAMP CONTROL FOR VEHICLES

Original application filed September 3, 1931, Serial No. 561,025, and in Great Britain September 17, 1930. Divided and this application filed May 9, 1932. Serial No. 610,227.

This invention relates to swivelling apparatus for vehicle head lamps, the present application being a division of United States patent application Serial No. 561,025, filed on 3rd September, 1931.

In vehicles provided with steering mechanism it has been customary to dispose one or more lamps on each side of the vehicle, and to provide mechanism by which, according to the direction the vehicle is steered, the lamps on one side of the vehicle are turned with a harmonic or differential movement with respect to the wheels, while the lamps on the other side are held stationary in the straight ahead position.

The object of the present invention is to provide very simple and efficacious mechanism, which not only gives a harmonic or differential turning movement to the lamps but may be readily adapted to different forms of steering mechanism and in its preferred form gives a multiplied differential motion to the lamps.

Preferably a head lamp is arranged to be turned more quickly at the beginning than at the end of its turn.

Swivelling apparatus according to this invention comprises in combination with projecting arms one for each lamp, a rod which is guided to reciprocate rectilineally between the lamps on either side of the vehicle and has its ends freely engaging the projecting arms on the lamps, and a pivotal lever—in one preferred form a crank lever—having a number of arms, one of which is connected by a link to the rod, and another is connected to the steering mechanism so that as the vehicle is turned the crank lever is oscillated to move the rod either to the right or to the left according to the turn, the movement of the rod causing one of its ends to abut the arms on the lamps on one side of the vehicle with a varying leverage so as to produce differential movement of the associated lamps, while the other end of the rod moves away from the arms on the lamps on the other side of the vehicle. With this arrangement a positive and easy operation of the lamps in accordance with the movement of the steering mechanism, is obtained.

Each lamp is controlled by a spring member which normally maintains the lamp against a stop in the stationary straight ahead position, and returns it to this position when the reciprocating rod has been restored after operating the lamp.

In a preferred method according to this invention, when the vehicle is turned either to the right or to the left, the corresponding lamp is arranged to be swivelled with the other lamp remaining stationary. This arrangement allows of the inner side of the curve to be effectively illuminated and the boundary of the road as the vehicle is turned to be sufficiently illuminated, so that objects can be clearly defined.

The invention is preferably applied to motor vehicles and to the control of a pair of lamps, one on each side of the vehicle, but it should be understood that the invention is also applicable to any vehicle constructed with steering apparatus which may be turned so that the lamps anticipate the movement of the vehicle.

The swivelling apparatus according to this invention may be associated with apparatus for dipping the lamps, both the dipping and the swivelling apparatus being operable independently of each other when required.

The features of the present invention will be more clearly understood with reference to the accompanying drawing, which, by way of example, shows the invention applied to the control of a pair of lamps and in association with dipping mechanism for the lamps.

In the drawing,

Figure 1 is a diagrammatic view, looking from the front of the vehicle, of one preferred construction of the swivelling apparatus with dipping gear;

Figure 2 is a plan of Figure 1, while

Figure 3 is a detail view showing another method of mounting the crank lever of Figures 1 and 2 with the connecting rod of the swivelling apparatus disposed in the axis of the dipping shaft.

Referring now to the drawing, each lamp 1 is secured to a spindle 2 mounted to rotate in a bearing 3 fixed to the cross shaft 18. Each bearing has a sleeve 5, around which a spring 8 is passed, having one end attached to the shaft 18 and the other end connected to a pin 7 on the lamp spindle 2, the pin 7 riding in a circumferential slot in the sleeve 5, so that the lamp—which is normally held in the straight ahead position by the spring pressure—can be turned against the resistance of the spring 8, thereby to provide energy for returning the lamp.

The construction of the above described spring member is clearly shown in Figure 9 of the parent application hereinbefore referred to, while the cross shaft 18 is a rotatable shaft mounted in bearings secured to the chassis of the vehicle, as described in the aforesaid application.

Secured to each lamp spindle 2 is a projecting arm or finger 11, the arms pointing along the longitudinal axis of the vehicle in substantial parallel relationship with one another, and having lying between them a reciprocating rod 41.

According to this invention the rod 41 is guided to slide rectilineally by means of guides 42, conveniently secured to the cross shaft 18, and has its ends freely engaging—either directly or indirectly as by pins 43—the arms 11. By this means when the reciprocating rod 41 is moved in one direction or the other, one of the ends 43 abuttingly acts on one of the arms 11 with a leverage which progressively increases as the particular arm 11 approaches a position parallel with the transverse axis of the vehicle. Consequently, the head lamp will be moved with a harmonic or differential movement wherein the rate of turning is at a maximum at the beginning of the turn and gradually reduces towards the latter stages of the turn. The other lamp will remain stationary under the the pressure of the spring 8, due to the end of rod 41 moving away from the associated arm 11.

Pivotally connected at 40 to the rod 41, is one end of a link 39, having its other end pivoted to an arm 35 at a radius which is relatively greater than the radii at which the ends of the rod 41 act on the arms 11, the arm 35 forming part of a pivotal crank lever—in this case a bell crank—34, which is pivoted at 37, and has a further arm 36—relatively shorter than the arm 35—connected by a rod 17 to the steering mechanism of the vehicle.

Reciprocation of the rod 17 rotates the crank lever 34, which, through its arm 35 and the link 39, imparts a multiplied harmonic or differential movement to one of the arms 11. By this means, when the vehicle first negotiates a bend, the appropriate lamp will be given a large initial movement, disproportionate to the movement given to the wheels of the vehicle, so that the inner boundary of the curve will be well illuminated, whereas as the angle of the turn increases the corresponding movement of the lamp will progressively decrease with the result that correct illumination of the curve is obtained throughout the turn of the vehicle, the other lamp remaining stationary to give a good light ahead.

In accordance with the preferred method, the angular movement imparted to the crank lever 34 when the vehicle is turned to the right, as when looking towards the front of the vehicle, is such as to cause the rod 41 to move to the right, thereby actuating the right hand lamp RL, whereas when the vehicle is turned to the left, the converse obtains.

To this end, therefore, the arm 36 may be connected to the steering control through the connecting rod 17 and transmission mechanism according to the British Specification No. 278,464, so that a right hand steering motion moves the connecting rod 17 backwards thereby imparting to the rod 41 a right hand transverse movement, and conversely, when the vehicle is turned to the left, a left hand transverse movement of the rod 41 results, thereby the lamp corresponding to the direction steered is the lamp rotated, whilst leaving the other lamp stationary.

On the other hand, if other forms of steering mechanism are used in which reverse movements of the connecting rod 17 obtain for the direction turned by the vehicle, then by a reverse mounting of the crank lever 34 rotation of the correct lamp will be ensured. Further, in order to adapt this embodiment of the invention, if necessary, to a vehicle in which the lamp on the outer side of a curve is turned in the direction steered, the respective ends of the rod 41 can conveniently be extended and be arranged to abut normally either directly or indirectly against the outer sides of the fingers 11 remote from each other; alternatively to achieve the same movement the crank lever 34 may be reversed.

To permit of dipping motion being imparted to the lamps, the latter are mounted on a rotatable dipping shaft, such as 18, which may be rotated by the means described in the parent specification, and to prevent the dipping motion effecting a swivelling motion of the lamps, more particularly when they are in the zero position, the connection between the crank arm 36 and the rod 17 is disposed in the centre line of the dipping shaft 18.

The rod 17 is connected to the arm 36 by means of a ball or universal joint 44, which is disposed in the axis of the dipping shaft by an extension 45 on the arm 36. Conveniently, the bell crank 34 is pivoted to the shaft 18 in such a position that the extension 45 depends over the outer end of the dipping shaft as shown in Figure 3.

Alternatively, as shown in Figures 1 and 2, the dipping shaft 18 may be provided with a reinforced recess 21 as described in the parent specification, into which recess the extension 45 depends so as to locate the joint 44 in the axis of the dipping shaft.

In the present construction it will be seen that the movement of the crank lever 34 as imparted to the fingers 11 on the lamps is multiplied by making the radius of the arm 35 longer than the radius of the arms 11 about its axis, while an additional multiplication of the movement of the bell crank lever is also obtained by making the arm 36 connected to the steering wheel mechanism somewhat shorter than the arm 35.

It will be seen, therefore, that with the swivelling and dipping arrangements according to this invention, considerable economy has been effected over the constructions previously proposed, together with the simplification of the working parts in order to improve the efficacy and maintenance of the device.

Moreover, it will be understood that it is not necessary to provide for dipping the lamps, in which case the latter, together with the guides 42 and the crank lever 44, may be mounted on a convenient part of the chassis as is shown in the parent application, and further the disposition of the parts may be varied as may be found suitable without affecting the novel construction of the invention, for example, the arms of the crank lever may be in different planes.

What I claim is:—

1. Swivelling apparatus for vehicle head lamps disposed on either side of the vehicle with restoring means for returning the lamps to initial position, the vehicle including steering mechanism, comprising in combination with projecting arms, one for each lamp, a reciprocating rod, guides for mounting the said rod to reciprocate rectilineally between the lamps with its ends freely engaging the projecting arms on the said lamps, a pivotal crank lever having a plurality of arms, a link for connecting one arm of the said lever to the said rod, and connecting means for connecting another arm of said lever to the steering mechanism of the vehicle.

2. Swivelling apparatus for vehicle head lamps disposed on either side of the vehicle with restoring means for returning the lamps to initial position, the vehicle including steering mechanism, comprising in combination with projecting arms, one for each lamp, means for mounting the said projecting arms on the lamps to project in substantially parallel relationship along the longitudinal axis of the vehicle, a reciprocating rod, guides for mounting the said rod to reciprocate rectilineally between the lamps with its ends freely engaging the projecting arms on the said lamps so as to produce a reduced rate of turning of a lamp towards the latter stages of the turning, a pivotal crank lever having a plurality of arms, a link for connecting one arm of the said lever to the said rod, and connecting means for connecting another arm of said lever to the steering mechanism of the vehicle.

3. Swivelling apparatus for vehicle head lamps disposed on either side of the vehicle with restoring means for returning the lamps to initial position, the vehicle including steering mechanism, comprising in combination with projecting arms, one for each lamp, a reciprocating rod, guides for mounting the said rod to reciprocate rectilineally between the lamps with its ends freely engaging the projecting arms on the said lamps, a pivotal crank lever having a plurality of arms, a link for connecting one arm of the said lever to the said rod, means for connecting the said arm to the said link at a radius greater than the radius at which the ends of the said rod normally engage the projecting arms, and connecting means for connecting another arm of the said crank lever to the steering mechanism of the vehicle.

4. Swivelling apparatus for vehicle head lamps disposed on either side of the vehicle with restoring means for returning the lamps to initial position, the vehicle including steering mechanism, comprising in combination with projecting arms, one for each lamp, means for mounting the said projecting arms on the lamps to project in substantially parallel relationship along the longitudinal axis of the vehicle, a reciprocating rod, guides for mounting the said rod to reciprocate rectilineally between the lamps with its ends freely engaging the projecting arms on the said lamps so as to produce a reduced rate of turning of a lamp towards the latter stages of the turning, a pivotal crank lever having a plurality of arms, a link for connecting one arm of the said lever to the said rod, means for connecting the said arm to the said link at a radius greater than the radius at which the ends of the said rod normally engage the projecting arms, and connecting means for connecting another arm of the said crank lever to the steering mechanism of the vehicle.

5. Swivelling apparatus for vehicle head lamps disposed on either side of the vehicle with restoring means for returning the lamps to initial position, the vehicle including steering mechanism, comprising in combination with projecting arms one for each lamp, a reciprocating rod, guides for mounting the said rod to reciprocate rectilineally between the lamps with its ends freely engaging the projecting arms on the said lamps, a pivotal crank lever having a plurality of arms of different lengths, a link for connecting the longer arm of said lever to the said rod, means for connecting the said longer arm to the said link at a radius greater than the radius at which the ends of the said rod normally engage the projecting arms and connecting means for connecting the shorter arm of the said crank lever to the steering mechanism of the vehicle.

6. Swivelling apparatus for vehicle head lamps disposed on either side of the vehicle with restoring means for returning the lamps to initial position, the vehicle including steering mechanism, comprising in combination with projecting arms, one for each lamp, means for mounting the said projecting arms on the lamps to project in substantially parallel relationship along the longitudinal axis of the vehicle, a reciprocating rod, guides for mounting the said rod to reciprocate rectilineally between the lamps with its ends freely engaging the projecting arms on the said lamps so as to produce a reduced rate of turning of a lamp towards the latter stages of the turning, a pivotal crank lever having a plurality of arms of different lengths, a link for connecting the longer arm of said lever to the said rod, means for connecting the said longer arm to the said link at a radius greater than the radius at which the ends of the said rod normally engage the projecting arms and connecting means for connecting the shorter arm of the said crank lever to the steering mechanism of the vehicle.

7. Swivelling apparatus for vehicle head lamps, the vehicle including steering mechanism, a dipping shaft carrying the said lamps on either side of the vehicle with restoring means for returning the lamps to initial position, and means for rotating the dipping shaft, comprising in combination with projecting arms, one for each lamp, a reciprocating rod, a dipping shaft including guides for mounting the said rod to reciprocate rectilineally between the lamps with its ends freely engaging the projecting arms on the said lamps, a pivotal crank lever having a plurality of arms, means for pivotally mounting the said crank lever on the said dipping shaft, a link for connecting one arm of the said lever to the said rod, connecting means for connecting another arm of the said crank lever to the steering mechanism of the vehicle and means for disposing the connection between the said connecting means and the said arm in the horizontal axis of the dipping shaft.

8. Swivelling apparatus for vehicle head lamps, the vehicle including steering mechanism, a dipping shaft carrying the said lamps on either side of the vehicle with restoring means for returning the lamps to initial position, and means for rotating the dipping shaft, comprising in combination with projecting arms, one for each lamp, means for mounting the said projecting arms on the lamps to project in substantially parallel relationship along the longitudinal axis of the vehicle, a reciprocating rod, a dipping shaft including guides for mounting the said rod to reciprocate rectilineally between the lamps with its ends freely engaging the projecting arms on the said lamps so as to produce a reduced rate of turning of a lamp towards the latter stages of the turning, a pivotal crank lever having a plurality of arms, means for pivotally mounting the said crank lever on the said dipping shaft, a link for connecting one arm of the said lever to the said rod, connecting means for connecting another arm of the said crank lever to the steering mechanism of the vehicle and means for disposing the connection between the said connecting means and the said arm in the horizontal axis of the dipping shaft.

9. Swivelling apparatus for vehicle head lamps, the vehicle including steering mechanism, a dipping shaft carrying the said lamps on either side of the vehicle with restoring means for returning the lamps to initial position, and means for rotating the dipping shaft, comprising in combination with projecting arms, one for each lamp, a reciprocating rod, a dipping shaft including guides for mounting the said rod to reciprocate rectilineally between the lamps with its ends freely engaging the projecting arms on the said lamps, a pivotal crank lever having a plurality of arms, means for pivotally mounting the said crank lever on the said dipping shaft, a link for connecting one arm of the said lever to the said rod, means for connecting the said arm to the said link at a radius greater than the radius at which the ends of the said rod normally engage the projecting arms, and connecting means for connecting another arm of the said crank lever to the steering mechanism of the vehicle.

10. Swivelling apparatus for vehicle head lamps, the vehicle including steering mechanism, a dipping shaft carrying the said lamps on either side of the vehicle with restoring means for returning the lamps to initial position, and means for rotating the dipping shaft, comprising in combination with projecting arms, one for each lamp, means for mounting the said projecting arms on the lamps to project in substantially parallel relationship along the longitudinal axis of the vehicle, a reciprocating rod, a dipping shaft including guides for mounting the said rod to reciprocate rectilineally between the lamps with its ends freely engaging the projecting arms on the said lamps so as to produce a reduced rate of turning of a lamp towards the latter stages of the turning, a pivotal crank lever having a plurality of arms, means for pivotally mounting the said crank lever on the said dipping shaft, a link for connecting one arm of the said lever to the said rod, means for connecting the said arm to the said link at a radius greater than the radius at which the ends of the said rod normally engage the projecting arms, and connecting means for connecting another arm of the said crank lever to the steering mechanism of the vehicle.

11. In a vehicle including a chassis and steering mechanism the combination of head lamps, supports mounted on either side of the chassis, lamp spindles to the lamps rotatably mounted in the said supports, restoring means for returning the lamps to initial position when turned, an arm on each lamp spindle projecting in substantially parallel relationship along the longitudinal axis of the chassis, a reciprocating rod mounted between the lamps on either side of the vehicle with its respective ends freely engaging the said projecting arms, guides secured to the chassis and guiding the said rod to reciprocate rectilineally across the chassis, a pivotal bell crank lever mounted to rotate on the chassis in juxtaposed relationship with said rod, an arm to the said lever projecting normally longitudinally of the chassis, a link pivotally connected at one end to the said rod and at the other end to the said arm, and a reciprocating rod connecting the cranked arm of the said lever with the steering mechanism of the vehicle for rotating the bell crank lever in accordance with the direction steered.

12. In a vehicle including a chassis and steering mechanism the combination of head lamps, supports mounted on either side of the chassis, lamp spindles to the lamps rotatably mounted in the said supports, restoring means for returning the lamps to initial position when turned, an arm on each lamp spindle projecting in substantially parallel relationship along the longitudinal axis of the chassis, a reciprocating rod mounted between the lamps on either side of the vehicle with its respective ends freely engaging the said projecting arms, guides secured to the chassis and guiding the said rod to reciprocate rectilineally across the chassis, a pivotal bell crank lever mounted to rotate on the chassis in juxtaposed relationship with the said rod, an arm to the said lever projecting normally longitudinally of the chassis beyond the said rod, a link pivotally connected at one end to the said rod and at the other end to the said arm at a radius greater than the radius at which the ends of the said rod engage the projecting arms, and a reciprocating rod connecting the cranked arm of the said lever with the steering mechanism for rotating the crank lever in accordance with the direction steered.

13. In a vehicle including a chassis and steering mechanism the combination of head lamps, supports mounted on either side of the chassis, lamp spindles to the lamps rotatably mounted in the said supports, restoring means for returning the lamps to initial position when turned, an arm on each lamp spindle projecting in substantially parallel relationship along the longitudinal axis of the chassis, a reciprocating rod mounted between the lamps on either side of the vehicle with its respective ends freely engaging the said projecting arms, guides secured to the chassis and guiding the said rod to reciprocate rectilineally across the chassis, a pivotal bell crank lever having its two arms of different lengths and mounted to rotate on the chassis in close juxtaposed relationship with the said rod, the longer arm of the said lever projecting normally longitudinally of the chassis beyond the said rod, a link pivotally connected at one end to the said rod and at the other end to the said longer arm at a radius greater than the radius at which the ends of the said rod engage the projecting arms, and a reciprocating rod connecting the shorter arm of the said lever with the steering mechanism for rotating the crank lever in accordance with the direction steered.

14. In a vehicle including a chassis and steering mechanism the combination of head lamps, a dipping shaft rotatably mounted on and transversely of the chassis supports mounted on the dipping shaft on either side of the vehicle, lamp spindles to the lamps rotatably mounted in the said supports, restoring means for returning the lamps to initial position when turned, an arm on each lamp spindle projecting in parallel relationship along the longitudinal axis of the chassis, a reciprocating rod mounted between the lamps on either side of the vehicle with its ends freely engaging the said projecting arms, guides secured to the dipping shaft and guiding the said rod to reciprocate rectilineally across the chassis parallel with the dipping shaft, a pivotal bell crank lever mounted to rotate on the said dipping shaft, an arm to the said lever projecting normally longitudinally of the chassis, a link pivotally connected at one end to the said rod and at the other end to the said arm, a reciprocating connecting rod extending to the steering mechanism for reciprocation thereby according to the direction steered, means for rotating the dipping shaft and means for connecting the cranked arm of the said lever to the said reciprocating connecting rod on the axis of the dipping shaft.

15. In a vehicle including a chassis and steering mechanism the combination of head lamps, a dipping shaft rotatably mounted on and transversely of the chassis, supports mounted on the dipping shaft on either side of the vehicle, lamp spindles to the lamps rotatably mounted in the said supports, restoring means for returning the lamps to initial position when turned, an arm on each lamp spindle projecting in parallel relationship along the longitudinal axis of the chassis, a reciprocating rod mounted between the lamps on either side of the vehicle with its ends freely engaging the said projecting arms, guides secured to the dipping shaft and guiding the said rod to reciprocate rectilineally across the chassis parallel with the dipping shaft, a pivotal bell crank lever mounted to rotate on the said dipping shaft, an arm to the said lever projecting normally longitudinally of the chassis beyond the said rod, a link pivotally connected at one end to the said rod and at the other end to the said arm at a radius greater than the radius at which the ends of the said rod engage the projecting arms, a reciprocating connecting rod extending to the steering mechanism for reciprocation thereby according to the direction steered, means for rotating the dipping shaft and means for connecting the cranked arm of the said lever to the said reciprocating connecting rod on the axis of the dipping shaft.

16. In a vehicle including a chassis and steering mechanism the combination of head lamps, a dipping shaft rotatably mounted on and transversely of the chassis supports mounted on the dipping shaft on either side of the vehicle, lamp spindles to the lamps rotatably mounted in the said supports, restoring means for returning the lamps to initial position when turned, an arm on each lamp spindle projecting in parallel relationship along the longitudinal axis of the chassis, a reciprocating rod mounted between the lamps on either side of the vehicle with its ends freely engaging the said projecting arms, guides secured to the dipping shaft and guiding the said rod to reciprocate rectilineally across the chassis parallel with the dipping shaft, a pivotal bell crank lever having its two arms of different lengths and mounted to rotate on the dipping shaft, the longer arm projecting normally beyond the said rod, a link pivotally connected at one end to the said rod and at the other end to the said longer arm at a radius greater than the radius at which the ends of the said rod engage the projecting arms, a reciprocating connecting rod extending to the steering mechanism for reciprocation thereby according to the direction steered, means for rotating the dipping shaft and means for connecting the shorter arm of the said lever to the said reciprocating connecting rod on the axis of the dipping shaft.

17. Swivelling apparatus for vehicle head lamps disposed on either side of the vehicle with restoring means for returning the lamps to initial position, the vehicle including steering mechanism, comprising in combination with projecting arms on the lamps each arm projecting radially from the axis of a lamp, a reciprocating rod, guides for mounting the said rod to reciprocate rectilineally between the lamps with its ends freely engaging the said projecting arms, and means for connecting the said rod to the steering mechanism so as to be reciprocated in accordance with the direction steered.

18. In a vehicle including a chassis and steering mechanism, the combination of head lamps, supports mounted on either side of the chassis, lamp spindles to the lamps rotatably mounted in the said supports, restoring means for returning the lamps to initial position when turned, an arm on each lamp spindle projecting in substantially parallel relationship along the longitudinal axis of the chassis, a reciprocating rod mounted between the lamps on either side of the vehicle with its respective ends freely engaging the said projecting arms, guides secured to the chassis and guiding the said rod to reciprocate rectilineally across the chassis, and means connecting the said rod to the steering mechanism so as to be reciprocated in accordance with the direction steered.

19. In a vehicle including a chassis and steering mechanism, the combination of head lamps, supports mounted on either side of the chassis, lamp spindles to the lamps rotatably mounted in the said supports, restoring means for returning the lamps to initial position when turned, an arm on each lamp spindle projecting in substantially parallel relationship along the longitudinal axis of the chassis, a reciprocating rod mounted between the lamps on either side of the vehicle with its respective ends freely engaging the said projecting arms, guides secured to the chassis and guiding the said rod to reciprocate rectilineally across the chassis, a pivotal lever having a plurality of arms and mounted to rotate on the chassis in juxtaposed relation with the said rod, a rod connecting one arm of said lever to the steering mechanism to oscillate the said lever in accordance with the direction steered and a link connecting another arm of the said lever to the said rod so as to transmit the movement of the lever to the rod.

In testimony whereof I affix my signature.

JULIAN SEYMOUR TRITTON.